United States Patent [19]

Ziegler et al.

[11] Patent Number: 4,744,532
[45] Date of Patent: May 17, 1988

[54] AIRCRAFT FLIGHT CONTROL SYSTEM

[75] Inventors: Bernard Ziegler, Leguevin; Michel Durandeau; Thierry Collard, both of Toulouse, all of France

[73] Assignee: Societe Nationale Industrielle et Aerospatiale, Paris, France

[21] Appl. No.: 93,100

[22] Filed: Sep. 1, 1987

Related U.S. Application Data

[63] Continuation of Ser. No. 925,509, Oct. 30, 1986, abandoned, which is a continuation of Ser. No. 689,174, Jan. 7, 1985, abandoned.

[30] Foreign Application Priority Data

Jan. 9, 1984 [FR] France .................... 84 00206
Jan. 9, 1984 [FR] France .................... 84 00207

[51] Int. Cl.$^4$ .............................................. B64C 9/00
[52] U.S. Cl. .................... 244/75 R; 91/464; 91/509
[58] Field of Search ............ 91/464, 509; 244/75 R, 244/78, 226, 227, 76 R

[56] References Cited

U.S. PATENT DOCUMENTS

| | | | |
|---|---|---|---|
| 3,062,192 | 11/1962 | Webb | 91/464 |
| 3,190,185 | 6/1965 | Rasmussen | 91/509 |
| 3,295,420 | 1/1967 | Gleason | 91/509 |
| 3,338,138 | 8/1967 | Wood | 244/78 |
| 3,529,514 | 3/1969 | Mayo et al. | 91/509 |
| 3,683,749 | 8/1972 | Boyles | 91/509 |
| 4,394,999 | 7/1983 | Botzler | 244/226 |
| 4,472,780 | 9/1984 | Chenoweth et al. | 244/194 |

*Primary Examiner*—Joseph F. Peters, Jr.
*Assistant Examiner*—Lynn M. Fiorito
*Attorney, Agent, or Firm*—Marshall, O'Toole, Gerstein, Murray & Bicknell

[57] ABSTRACT

Flight control system for aircraft of the type provided with ailerons, elevators, upper surface spoilers, and upper surface air-brakes, a rudder and horizontal stabilizers with variable angle of incidence, said system comprising an electric control, in some cases without any mechanical emergency control for said upper surface spoilers and air-brakes.

According to the invention:
the ailerons and elevators are electrically controlled without any mechanical aid,
the rudder is mechanically controlled, and
the horizontal stabilizers with variable angle of incidence are electrically controlled with mechanical aid.
the electrical flight controls are optimized.

15 Claims, 3 Drawing Sheets

AIRCRAFT FLIGHT CONTROL SYSTEM

This application is a continuation, of application Ser. No. 925,509, filed 10/30/86, abandoned which is a continuation of application Ser. No. 689,174, filed Jan. 7, 1985 abandoned.

The present invention relates to an aircraft flight control system.

Electrical flight controls are known to give the possibility of utilizing a flight computer in the best conditions and they are known to have, over the mechanical flights controls, the following advantages:

mass gain;

possibility to take into account the evolved piloting laws and parameters which v a r y as a function of the flight concondions, permitting in particular to improve the flight qualities and a rear re-alignment piloting, which improves performances;

possibility to take into account functions, such as wing load control or lift modulation:

simplification of assembly and adjusting work;

possibility to use new piloting instruments, such as the ministick, of small dimensions, which can be disposed laterally with respect, to the pilot and/or co-pilot.

It is not however possible, these days, to prove that temporary failure of all the electric flight controls is highly improbable (namely below $10^{-9}$ per hour of flight), and therefore emergency mechanical transmission controls must be available.

Civil aircrafts currently in service offer the following solutions:

transmission of the pilot's orders by means of mechanical mixers and servo-motors (system known as "control wheel steering" or transparent piloting) the control linkage being installed from the piloting instruments to the rudders;

power servo-controls with normal electric control, combined with a mechanical emergency control, such as for example on the CONCORD;

electric control, without mechanical assistance for the servo-control of the spoilers and air-brakes, and mechanical rod assembly for controlling the servo-controls associated to the ailerons, such as for example on the AURBUS A310, A300-600, and on the BOEING B767 and B757.

All these different known solutions only permit to obtain part of the advantages of electric controls, and often at the cost of a greater complexity: therefore they are not optimized.

It is the object of the present invention to overcome the aforesaid disadvantages by proposing an aircraft flight control system provided with ailerons, elevators, upper surface spoilers and air brakes, a rudder and stabilizers with variable angle of incidence, said system, comprising electrical controls, in some cases without an emergency mechanical control, for the said spoilers and air brakes, is remarkable in that the said ailerons and elevators are controlled electrically without any mechanical aid, in that the rudder is controlled mechanically and in that the stabilizers with variable angle of incidence are controlled electrically with mechanical aid.

It is possible with the present invention to optimize the control of pitch and roll whilst preserving an adequate pilotability in order to keep the aircraft on its flight path in the event of a temporary failure of the electrical supplies. It is indeed a known fact that control of the rudder also induces roll, whereas an aircraft can be piloted in pitch by the stabilizers with variable angle of incidence. Thus, in the event of failure of the electrical supplies, the spoilers, air-brakes, ailerons and elevators will become unusable, but the aircraft will continue to be pilotable in yaw, in roll and in pitch due to the mechanical control of the rudder and to the mechanical emergency control of the stabilizers with variable angle of incidence.

Also, the following remarks can be made about the structure of the flight control system according to the invention:

a servocontrol system with two types of controls (electrical and mechanical) is more complex, heavier and more expensive than a servocontrol system with only one type of control; consequently, the invention gives the possibility of making considerable savings on maintenance, weight and costs as regards the control of the ailerons, elevators and rudder;

the introduction of evolved piloting laws, worked out by computers, is particularly advantageous for pitch and roll control; such laws can be taken into account by the system according to the invention since the ailerons and elevators are electrically controlled;

the elimination according to the invention of the mechanical control of the ailerons and elevators entails an important reduction of piloting strain, this permitting to miniaturize the piloting instruments.

The present invention further permits an organization of electrical flight controls particularly adapted to the aforesaid system of mechanical and electrical flight controls.

To this end, the invention proposes an aircraft flight control system comprising at least one computer controlling and monitoring the members (servocontrols, motors, jacks, etc. . .) provided for actuating said ailerons, elevators, upper surface spoilers, upper surface air brakes and the stabilizers, which system is remarkable in that it comprises a first computer unit operationally coupled to said ailerons, elevators and stabilizers with variable angle of incidence, and a second computer unit, different in design and origin from the first computer unit and operationally coupled to said upper surface spoilers and upper surface air brakes as well as to said elevators in case of failure of said first computer unit.

Said first and second computer units being of different design and origin, enable to avoid the risks of simultaneous breakdowns due to faulty design or construction. Any likelihood of the two computer units breaking down simultaneously is therefore very small. In any case, because of the structure of the control system according to the invention:

if the first computer unit fails, the aircraft remains controllable in yaw, by the mechanical control of the rudder, in roll by both the rudder and the electrical control of at least some of the spoilers by said second computer unit, and in pitch, by both the mechanical emergency control of the stabilizers and by the electrical emergency control of the elevators by said second computer unit;

if the second computer unit fails, the aircraft remains electrically and mechanically controllable in yaw, in roll and in pitch, only certain upper surfaces, which can optionally be replaceable by the ailerons, being unusable;

finally, if said first and second computer units fail, as indicated hereinabove, the aircraft is mechanically controllable in yaw, in roll and in pitch.

Advantageously, said first computer unit comprises two separate computers whereas two electro-hydraulic controls are operationally coupled to each aileron, to each elevator and to the stabilizers with variable angle of incidence, one of which electro-hydraulic controls is controlled by one of said computers and the other by the other computer. Two electro-hydraulic servocontrols can thus be provided for each aileron and for each elevator, as well as two hydraulic motors controlled by servovalve, for the stabilizers with variable angle of incidence.

It is a wellknown fact that servocontrols, working in parallel and controlled directly by servovalves, are difficult to synchronize without any special devices provided to this effect. Indeed, the errors of characteristics of the servovalves and of the return-to-position sensors result, for a given order, in a transcribing error; consequently, the position differences between servocontrols controlled by the same order and attached to the same surface entails some hysteresis in the controls and stresses in the joints, this causing structural fatigue.

It is also known that a trailing edge surface such as an aileron or an elevator, which is not dynamically balanced, may be subject to flutter if it is not controlled or dampened.

To overcome these disadvantages, the invention further provides that, on the one hand, each electro-hydraulic servocontrol for an aileron or an elevator can take at least an active position in which said aileron or elevator is controlled, and at least a passive position in which said aileron or said elevator is dampened and that, on the other hand, one of the two operationally coupled electro-hydraulic servocontrols is in the active position when the other is in the passive position and vice-versa.

Moreover, the likelihood of two hydraulic circuits failing on an aircraft is of the order of $10^{-7}$ or $10^{-8}$ per hour of flying. Such an occurrence should not have any catastrophical consequences and should not involve the flutter of any aerodynamic control surface. This, therefore implies that, in the case of an aileron or of an elevator controlled by two electro-hydraulic servocontrols, said latter must ensure, in case of failure of the hydraulic circuits supplying them, a dynamic damping of the aileron or elevator which they control, even if the failure of the hydraulic circuits is due to a breakdown in the pipe system supplying said servocontrols. Thus, according to a characteristic of the present invention, said electro-hydraulic servocontrols operationally coupled to the ailerons and to the elevators automatically take up their passive position, as soon as their supply in hydraulic pressure stops.

Advantageously, the control of the stabilizers with variable angle of incidence can comprise two hydraulic motors, each one being controlled by a servovalve.

In normal control conditions, one of the motors is controlled by its servovalve, whereas the other motor is inoperative. Under emergency control, the two hydraulic motors are controlled in parallel by a mechanical control.

It will be noted that the mechanical emergency control of the stabilizers with variable angle of incidence loses efficiency if the elevators operationally coupled thereto are not rigidly held at a nil angle of incidence, in order to be placed in the wind's eye. Thus, according to another special feature of the invention, the servocontrols of the elevators can take up a third position of re-alignment, for which, without an electrical order, is mechanically imposed a control to a predetermined re-alignment position.

Moreover, the servocontrols operationally coupled to the ailerons will, advantageously be capable of taking another passive position without dampening in order to instantly take into account any vertical gust of wind.

According to one advantageous embodiment of the invention, an aileron servocontrol having an active position and a dampened passive condition, comprises a servovalve, a jack with two cylinder chambers separated by a piston with symmetrical faces connected to said aileron, an electrovalve comprising two first orifices respectively connected to said cylinder chambers, two second orifices connected together by a contraction or the like and two third orifices connected respectively to the outputs of said servovalve, said first and second orifices being respectively connected together when the electrovalve is not energized, whereas said first and third are respectively interconnected when said electrovalve is energized.

In like manner, a servocontrol for aileron according to the invention, with one active position and two passive positions, one of which is dampened and the other is not, comprises a servovalve, a jack with two cylinder chambers separated by a piston with symmetrical faces connected to said aileron, two electrovalves, each one comprising three pairs of orifices, the first pair of which is respectively connected to the second pair when said electrovalve is not energized and to the third pair when said electrovalve is energized, said first pair of orifices of the first electrovalve being respectively connected to said jack chambers, whereas said second pair of orifices of the first electrovalve is respectively connected to said first pair of orifices of the second electrovalve, and said third pair of orifices of said first electrovalve being respectively connected to the outputs of said servovalve, said second pair of orifices of said electrovalve being connected together by a contraction or the like and said third pair of orifices of the second electrovalve being connected together by a free communication.

The servocontrol of an elevator with an active position, a passive position and, an automatic re-aligning position, can comprise a servovalve having a mechanical input, a jack with two cylinder chambers separated by a piston with symmetrical faces which is connected to said elevator, a sensor for detecting the position of said piston and controlling a centering position of said elevator with respect to the stabilizers with variable angle of incidence, a mechanical connection between said sensor and said mechanical input of the servovalve and an electrovalve comprising two first orifices respectively connected to said cylinder chambers, two second orifices respectively connected to the outputs of the servovalve and two third orifices connected together by a contraction or the like, said first and second orifices being respectively connected together when the electrovalve is not energized whereas said first and third orifices are respectively connected together when said electrovalve is energized.

Each of said servocontrols can be equipped with a system of flaps isolating said servocontrol from its external hydraulic connections when the pressure of the fluid inside the latter reduces or disappears, and with a reservoir of fluid under pressure to keep up the hydraulic filling of the circuits of said servocontrol when the latter is isolated by said flap system.

Moreover, the said second computer unit comprises a plurality of separate computers, each one of which controls part of the spoilers and upper surface air-brakes and has normal control functions and emergency control functions.

The invention will be more readily understood on reading the following description with reference to the accompanying drawings, in which.

The figures in the drawings use identical references to designate similar elements.

Figure 1:
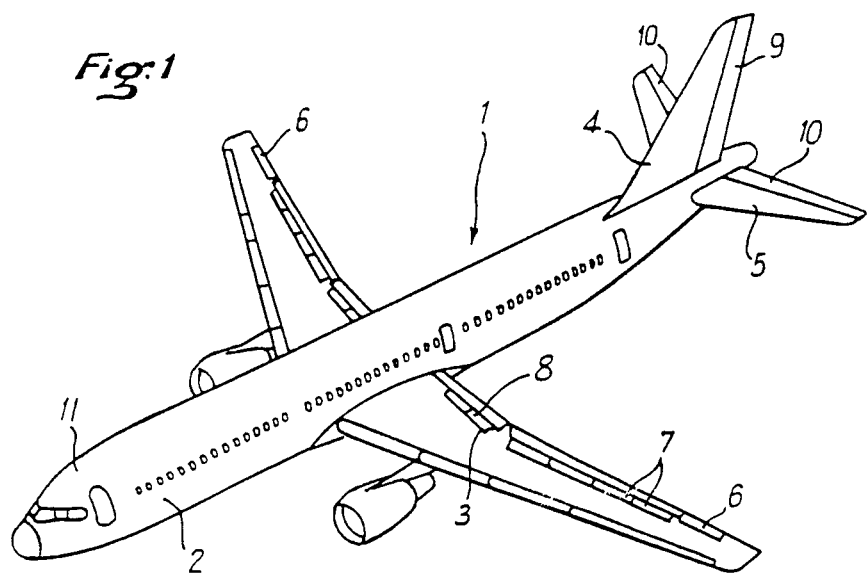
FIG. 1 shows a plan perspective of a large transport aircraft using the flight control system according to the invention.

The large transport aircraft 1 shown in perspective in FIG. 1, comprises a fuselage 2, wings 3, and vertical 4 and horizontal 5 stabilizers.

Trailing edges ailerons 6 are provided on the upper surface of the wings 3 for roll control, as well as roll spoilers 7 and air-brakes 8. On the vertical stabilizer 4 is provided a rudder 9 whereas elevators 10 are hinged on the trailing edge of the horizontal stabilizer 5. Furthermore, said horizontal stabilizer 5 is mounted for pivoting with respect to the fuselage 2, in order to allow its angle of incidence to vary.

According to the present invention, there are provided, starting from the cockpit 11:
electrical connections controlling the ailerons 6, the spoilers 7, the air-brakes 8 and the elevators 10;
a mechanical connection controlling the rudder 9 (not shown in the figures);
an electrical connection assisted by a mechanical emergency connection, to control the horizontal stabilizer 5.

Obviously, the power member used for actuating said ailerons, spoilers, air-brakes, elevators and horizontal stabilizers, and which are electrically controlled can be either of the same type as those controlled directly by electrical signals, or of the same type as those comprising a mechanical input driven by a servomotor system which is itself controlled electrically.

It is also obvious that manual control orders can be issued by sensors connected, to conventional control members or to ministicks, coupled or non-coupled.

In the embodiment illustrated in FIG. 2, the aircraft 1 is controlled, from control instruments 12, as follows:
in roll:
(a) by an aileron 6 provided at each end of the wings 3.

To each aileron 6 are operationally coupled two electric servocontrols 13. There is no mechanical emergency control provided for the ailerons.

(b) by four spoilers 7, in external position with respect to the air-brakes 8.

To each spoiler 7 is operationally coupled one electrical servocontrol 14, with no mechanical emergency control.

in pitch:

(c) by two elevators 10, one on each side of the fuselage. To each elevator 10 are operationally coupled two electrical servocontrols 15. There is no mechanical emergency control provided for the elevators.

(d) by horizontal stabilizer 5 with variable angle of incidence. The latter is actuated by a jack 16 which can be electrically controlled from control members 12, or mechanically controlled from one specific hand-operated member 17, such as a winch. The jack 16 can be driven by two hydraulic motors 18.

In normal control conditions, either of said motors 18 is controlled by way of a servovalve 19, the other motor remaining inoperative. In emergency operation, the two motors 18 are controlled in parallel from said hand-operated member 17.

in yaw:
(e) by the mechanically controlled rudder 9.

The air-brakes 8 are each controlled by an electrical servocontrol 20, with no mechanical emergency control aid.

In the control chain between the control elements 12 and the different electrically controlled aerodynamical surfaces 5, 6, 7, 8 and 10 are interposed different computers controlling same.

The control system according to the invention comprises first of all, two computers 21 providing:
The control of servocontrols 13 of the roll ailerons 6;
normal control of servocontrols 15 of the elevators 10; and
the normal control, via servovalves 19, of hydraulic motors 18 of the jack 16 actuating horizontal stabilizer 5 with variable angle of incidence.

The two computers 21 are, for example, of identical design, technology and origin, and each one controls and monitors the good operation of a servocontrol 13 of each aileron 6, of a servocontrol 15 of each elevator 10 and of a hydraulic motor 18 of the horizontal stabilizer jack.

The system according to the invention thereafter comprises four computers 22 which are all identical in design, technology and origin, but different in design, technology and origin from those of the two computers 21. Said computers 22 procure:
the control of servocontrols 14 and 20 of spoilers 7 and air-brakes 8; and
the emergency control of servocontrols 15 of the elevators 10.

Each computer 22 fulfills normal control functions as well as emergency control functions:
in normal operation conditions, each computer 22 controls and monitors one or two pairs of spoilers 7 and air-brakes 8;
in case of failure of one of computers 22, the control and monitoring of spoilers 7 and/or air-brakes 8 associated thereto, is taken over by one of the computers 22 still working normally;
in case of failure, of computers 21 normally controlling and monitoring the elevators 10, a computer 22 takes over the control and monitoring of a servocontrol 15 of each of the two elevators 10, whereas the control and monitoring of the two remaining servocontrols 15 are assumed by another one of computers 22.

Figure 2:
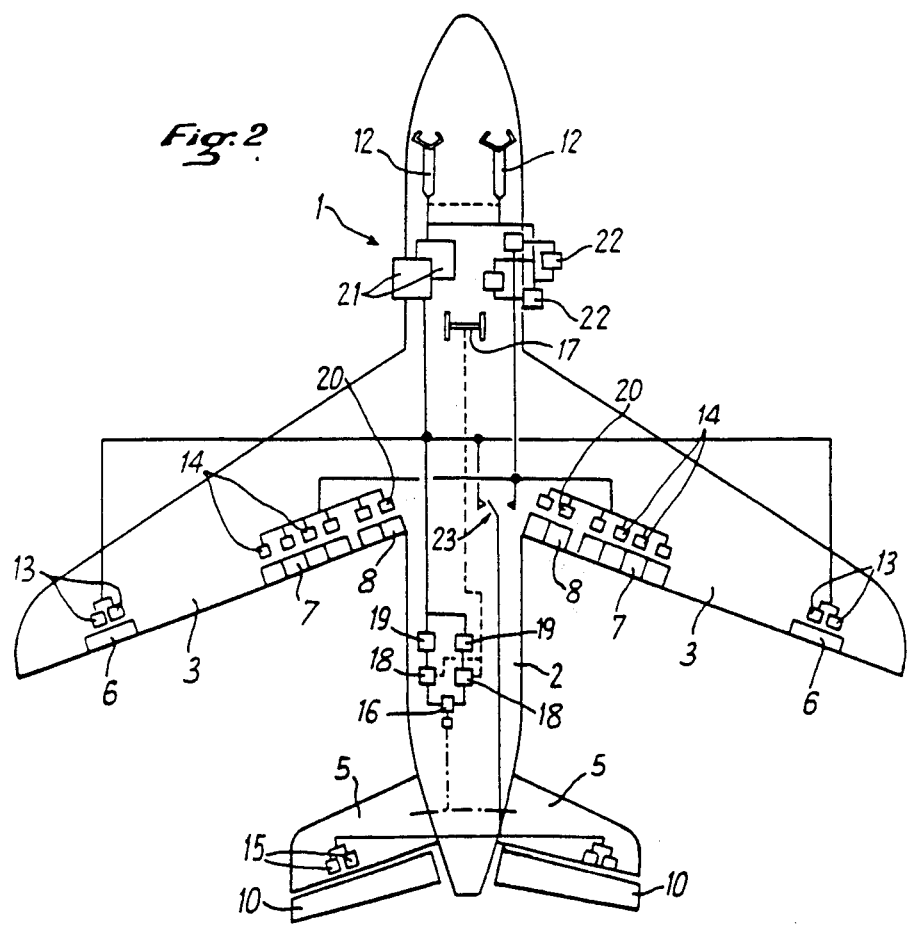
FIG. 2 is a diagrammatical view of the flight control system according to the invention.

In FIG. 2, the possibility of passing from the normal control of the elevators 10 by computers 21 to an emergency control thereof by computers 22 is represented by switch 23.

Figure 3:
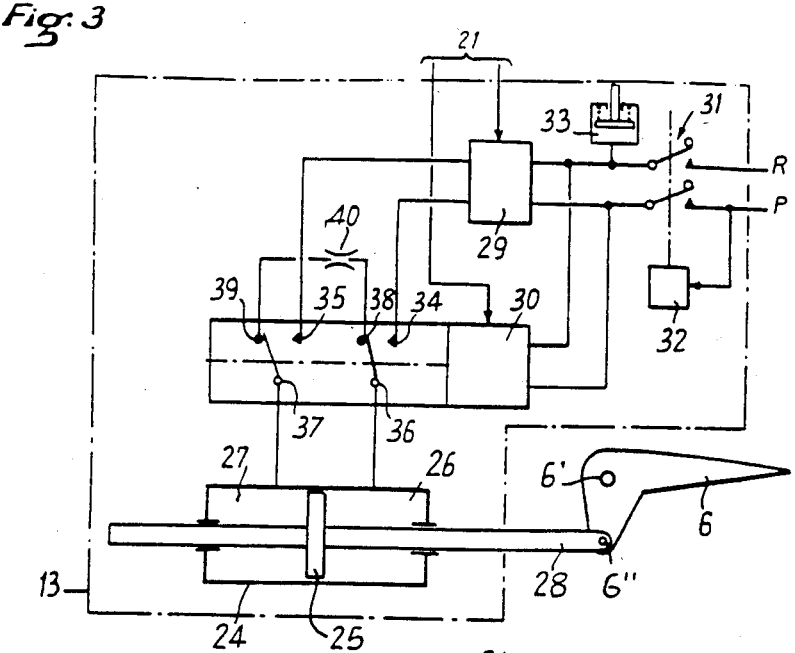
FIG. 3 is a block diagram of an aileron servocontrol according to the invention.

As indicated hereinabove, to each aileron 6 are operationally coupled two servocontrols 13. Said servocontrols can work at least in two ways, an active way and a passive dampened way. When one of the servocontrols 13 of an aileron 6 is working in the active way, the other servocontrol 13 of the same aileron 6 works in the dampened-way. FIG. 3 gives a block diagram of such a servocontrol 13 with two working modes. In said FIG. 3, the aileron 6 is supposed to be hinged in 6'on a wing 3 of the aircraft 1.

The servocontrol 13 for an aileron 6, showed in the inoperative position in FIG. 3, comprises a hydraulic jack 24 of which the piston has identical opposite faces and divides the cylinder of said jack into two chambers 26 and 27. A piston rod 28, integral with said piston 25, is hinged in 6" on the aileron 6, so as to convert the rectilinear to-and-fro movement of the piston rod 28 into a rotating movement of the aileron 6 about articulation 6'. The servocontrol 13 further comprises a servovalve 29 and an electrovalve 30, both electrically controlled by computers 21, and hydraulically connected to a line P of pressurized fluid and a return line R returning the fluid through isolation flaps 31 controlled by hydraulic actuating means 32. A reserve of fluid 33 is situated between the servovalve 29 and the electrovalve 30, on the one hand, and the flaps 31, on the other. Said electrovalve 30 comprises two orifices 34 and 35, which are respectively able to be connected to the pressure line P and to the return line R via servovalve 29, two orifices 36 and 37 which are respectively connected to chambers 26 and 27 of jack 24, and two orifices 38 and 39 connected together by a contraction or fluid laminating device 40. When electrovalve 30 is not operative, it creates a communication between orifice 36 and orifice 38, and between orifice 37 and orifice 39.

On the contrary, when electrovalve 30 is energized, it creates a communication between orifices 36 and 34 and between orifices 37 and 39 respectively.

Thus, when the hydraulic pressure is on line P, the flaps 31 are closed by actuator 32 and the servovalve 29 is fed with fluid. If electrovalve 30 is energized, orifices 34 and 35 are respectively connected with chambers 26 and 27 of the jack 24, so that aileron 6 is controlled as a function of the orders sent by computers 21 to servovalve 29. Servocontrol 13 is then in the active position. On the contrary, when electrovalve 3 de-energized, orifices 36 and 37 are respectively connected with orifices 38 and 39, so that the two chambers 26 and 27 of jack 24 communicate together, through contraction device 40. The movements of aileron 6 are then dampened by said device 40.

In the case where the pressure of the hydraulic fluid disappears in line P, the actuating member 32 opens the flaps 31 and electrovalve 30 is de-energized by computers 21. The servocontrol 13 is then in its dampened condition and isolated from the hydraulic supply. The reserve of fluid 33 permits to keep the circuits of servocontrol 13 filled, hence to guarantee dampening of the aileron 6, even in case of slight leakages or differential expansions after isolation. If the hydraulic supply to that of the servocontrols 6, operationally coupled to the aileron 6 and which was active, fails, computers 21 control to the active position, the other servocontrol 6 which was in the dampened position.

Figure 4:
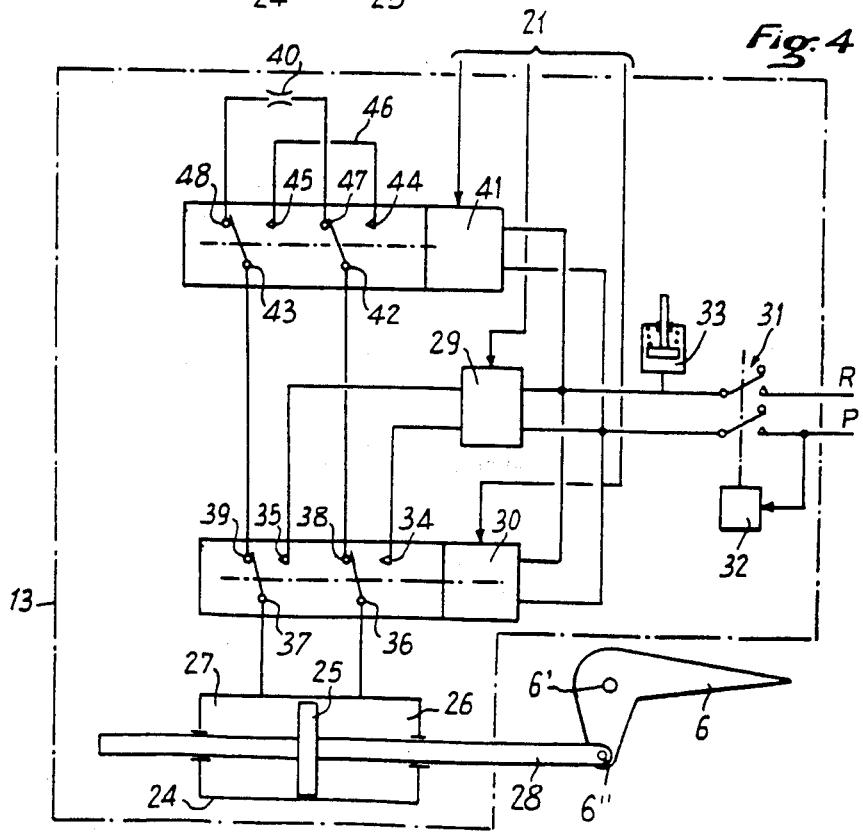
FIG. 4 is a block diagram of a variant embodiment of the aileron servocontrol shown in FIG. 3.

FIG. 4 shows a block diagram of a variant embodiment of the servocontrols 13 operationally coupled to ailerons 6. This variant embodiment contains the full disposition 24 to 39 described in reference to FIG. 3. It comprises an additional electrovalve 41, which is electrically connected to computers 21 and hydraulically connected to lines P and R, in the same way as electrovalve 30. Said additional electrovalve 41 comprises two orifices 42 and 43 respectively connected to orifices 38 and 39 of electrovalve 30, two orifices 44 and 45 connected together by a free communication 46 and two orifices 47 and 48 connected together via the contraction or laminating device 40. When not energized, additional electrovalve 41 connects orifices 42 and 43 with orifices 47 and 48 respectively; on the contrary, when energized, said electrovalve 41 sets up a hydraulic communication between orifices 42 and 43 and orifices 44 and 45 respectively.

Thus, as indicated hereinabove, when electrovalve 30 is energized, it connects servovalve 29 with chambers 26 and 27 of the jack 24, so that aileron 6 responds to the orders supplied to said servovalve by computers 21. The servocontrol is thus in its active condition.

On the contrary, when electrovalve 30 is not energized or when the pressure is lost on line P, the chambers 26 and 27 of the jack 24 are connected to electrovalve 41, respectively through connections 36, 38, 42 and 37, 39, 43. In this case:

If electrovalve 41 is not energized, the two chambers 26 and 27 of jack 24 are connected together by the contraction or laminating device 40 and the servocontrol 13 is in its dampened condition.

On the contrary, electrovalve 41 is energized, the two chambers 26 and 27 of the jack 24 are connected together by free communication 46. This configuration is used when controlling the wing load, to respond with a fast and full nose-lift of the aileron 6, to a heavy vertical load imposed by a gust of wind.

Thus, the servocontrol 13 shown in FIG. 4 comprises a third mode, which can be called drifting. This mode can be chosen (by energizing electrovalve 41) even if there is no hydraulic pressure on line P. As indicated already, the flap system 31 permits to isolate the servocontrol 13 from its hydraulic supplies in case of pressure reduction, whereas reserve 33 enables to keep up with the hydraulic filling.

The servocontrols 14 and 20 of spoilers 7 and airbrakes 8 can be of any known type and controlled by a servovalve (not shown) with shifted zero; a mechanical shift, such that, without any control voltage from computers 22, the corresponding spoiler or air-brake moves to its retracted position, is applied to said servovalve. It is thus possible to prevent ill-timed spreading. To control such a servocontrol to the required position, a voltage designed to cancel the mechanical shift is superposed to the normal control voltage. A system of isolating flaps is provided, which system performs, when there is no hydraulic pressure, a hydraulic locking of the means actuating the spoiler or the air-brake, thus preventing said actuating means from moving in the direction of the extension of said spoiler or air-brake. A mechanical device which is accessible from the outside, enables to release said hydraulic locking for maintenance on the ground operations.

Figure 5:
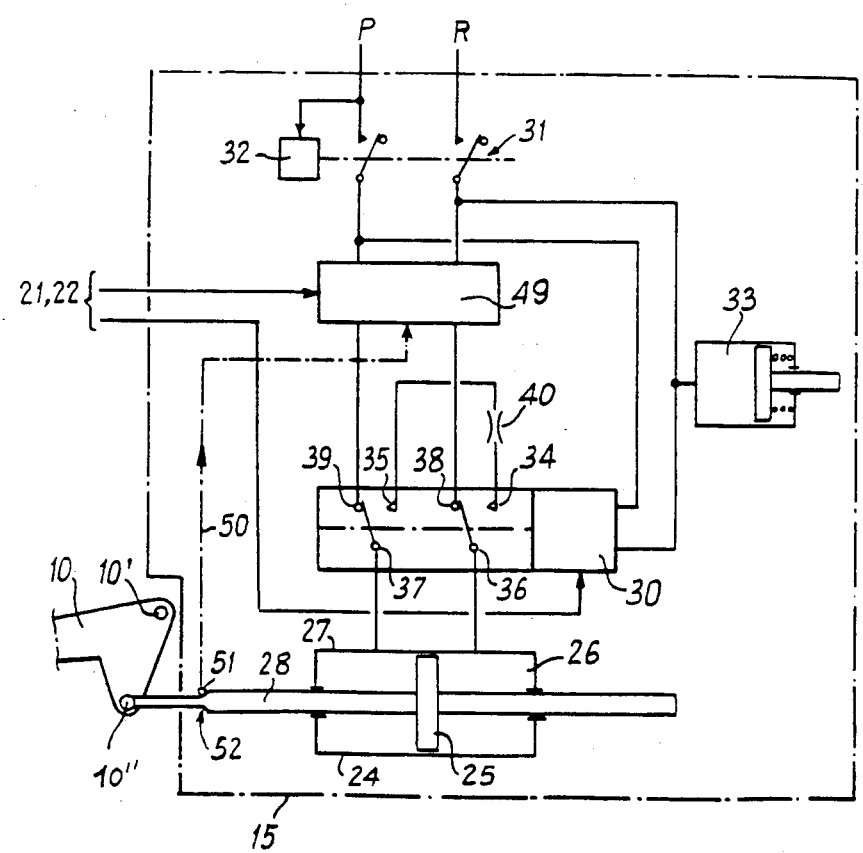
FIG. 5 is a block diagram of an elevator servocontrol according to the invention.

FIG. 5 gives a block diagram of a servocontrol 15 which, being operationally coupled with another identical servocontrol, controls each elevator 10 hinged in 10' on the horizontal stabilizers 5.

As indicated hereinabove with reference to FIGS. 3 and 4, the servocontrol is fed with hydraulic fluid by feed lines P and R and comprises a symmetrical jack assembly 24 to 28 controlling elevator 10 via hinged connection 10", as well as an electrovalve assembly 30, 34 to 39 whose orifices 36 and 37 are respectively connected to chambers 26 and 27. A servovalve 49 is connected to orifices 38 and 39 of electrovalve 30, whereas a fluid restriction or laminating device 40 is provided between orifices 34 and 35 of electrovalve 30. The hydraulic supply of electrovalve 30 and of servovalve 49 is achieved from lines P and R, via a system ensuring isolation and constant filling 31, 32, 33 of the type described hereinabove. Electrovalve 30 and servovalve 49 are electrically connected with computers 21, or in an emergency, with computers 22, via switch 23.

Servovalve 49 is of the type comprising, in its first stage, a movable element (flapper or jet pipe) adapted to be mechanically connected, via a connection 50 to a sensor 51 sliding on a ramp 52 of the piston rod 28. Thus, to the normal electrically-controlled movement of the said movable element of servovalve 49 is added a mechanically induced movement. The ramp 52 of jack rod 28 is so selected as to impose, via the sensor 51 and the mechanical connection 50, a nil displacement (re-aligning), when elevator 10 has a nil angle of incidence with respect to the horizontal stabilizers 5 to which it is hingedly assembled.

When electrovalve 30 is not energized, chambers 26 and 27 of jack 24 are connected to servovalve 49, via connections 36, 38 and 37, 39 respectively. Servovalve 49 can then control elevator 10 as a function of the orders received from computers 21 or 22. Obviously, said orders take into account the perturbation created by the mechanical connection 50 and comprise an electrical signal designed to cancel the effect thereof. One is then in active mode.

If electrovalve 30 is energized, or else if a reduction of pressure is detected on line R, the two chambers 26 and 27 of jack 24 are connected together by device 40 so that one is in dampened mode of the elevator 10.

If electrovalve 30 is not energized and if the servovalve receives no orders from the computers, the mechanical connection 50 proceeds to a re-aligning of the elevator 10 with respect to horizontal stabilizers 5.

Every servocontrol is therefore capable of following three modes, the active mode, the dampened mode and the re-aligning mode.

In normal operation conditions, the two servocontrols 15 operationally coupled to an elevator 10 are, one in the active mode and the other in the dampened mode. In the event of servocontrol 15 losing control whilst in active mode, said servocontrol passes to dampened mode and computers 21 or 22 activate the servocontrol which was in the dampened mode. In the event of hydraulic pressure P being lost for the two servocontrols 15 of an elevator 10, both said servocontrols pass to the dampened mode. If the two controls of the two servocontrols are lost, both pass to to the re-aligning mode.

We claim:

1. In an aircraft, an electrical-mechanical compound flight control system comprising:
   piloting means (12);
   computer means (21, 22) receiving piloting orders from said piloting means (12);
   ailerons (6), upper surface spoilers (7) and upper surface air-brakes (8);
   first, second and third actuator means (13, 14, 20) for respectively actuating said ailerons (6), said upper surface spoilers (7) and said upper surface air-brakes (8), said first, second and third actuator means being electrically controlled by said computer means (21, 22) and said ailerons (6) being exclusively actuated by said first actuator means (13);
   a rudder (9) mechanically controlled by said piloting means (12);
   elevators (10);
   fourth actuator means (15) for actuating said elevators (10), said fourth actuator means (15) being electrically controlled by said computer means (21, 22) and said elevators (10) being exclusively actuated by said fourth actuator means (15);
   horizontal stabilizers (5) with variable angle of incidence;
   a hand-operated mechanical member (17);
   a fifth actuator means (16) for actuating said horizontal stabilizers (5), said fifth actuator means (16) being electrically controllable by said computer means and mechanically controllable by said hand-operated member (17).

2. Flight control system for aircraft as claimed in claim 1 comprising at least one computer for controlling and monitoring the means actuating said ailerons, elevators, upper surface spoilers, upper surface air-brakes and horizontal stabilizers, wherein said system comprises a first computer u n i t operationally coupled to said ailerons, elevators, and horizontal stabilizers with variable angle of incidence, and a second computer unit, different in design and origin from the first computer unit, and operationally coupled to said spoilers and air-brakes, as well as to said elevators in case of failure of said first computer unit.

3. Flight control system as claimed in claim 2, wherein said first computer unit comprises two separate computers whereas to each aileron, each elevator and each horizontal stabilizer with variable angle of incidence, are operationally coupled two electro-hydraulic controls, one of which is controlled by one of said computers and the other is controlled by the other computer.

4. Flight control system as claimed in claim 3, wherein on the one hand, each electro-hydraulic servocontrol for an aileron can take up at least one active state for which said aileron is controlled and at least one passive state, for which said aileron is dampened and, on the other hand, one of the two servocontrols operationally coupled to an aileron is in its active state when the other is in its passive state and vice-versa.

5. Flight control system as claimed in claim 3, wherein on the one hand, each electro-hydraulic servocontrol for an elevator can take up at least an active state for which said elevator is controlled and at least a passive state, for which said elevator is dampened, and on the other hand, one of the two servocontrols operationally coupled to an elevator is in its active state when the other is in its passive state, and vice-versa.

6. Flight control system as claimed in any one of claims 4 or 5, wherein said electro-hydraulic servocontrols automatically take up their passive state, as soon as the hydraulic pressure supplying them stops.

7. Flight control system as claimed in claim 3, wherein the electro-hydraulic control of the horizontal stabilizers with variable angle of incidence comprises two hydraulic motors, each one of which is controlled by a servovalve, so that one of the motors is controlled by its servovalve when the other one is inoperative.

8. Flight control system as claimed in claim 5, wherein said electro-hydraulic servocontrols of said elevators can take up a third state for which, without any electrically induced order, the position of said elevators is related to a predetermined position corresponding, at least approximately, to a nil angle of incidence with respect to said horizontal stabilizers.

9. Flight control system as claimed in claim 4, wherein said electro-hydraulic servocontrols of the ailerons can take up a third passive state without any dampening of the movement of said ailerons.

10. Flight control system as claimed in claim 4, wherein each electro-hydraulic servocontrol for an aileron comprises a servovalve, a jack with two cylinder chambers separated symmetrical faces connected to said aileron, an electrovalve comprising two first orifices respectively connected to said cylinder chambers, two second orifices connected together by a contraction or the like and two third orifices connected respectively to the outputs of said servovalve, said first and second orifices being respectively connected together when the electrovalve is not energized, whereas said first and third orifices are respectively connected when said electrovalve is energized.

11. Flight control system according to claim 9, wherein each electro-hydraulic servocontrol for an aileron comprises a servovalve, a jack with two cylinder chambers separated by a piston with symmetrical faces connected to said aileron, two electrovalves, each comprising three pairs of orifices, the first pair being respectively connected to the second pair when said electrovalve is not energized and to the third pair when said electrovalve is energized, said first pair of orifices of the first electrovalve being respectively connected to said jack chambers, said second pair of orifices of the first electrovalve being connected respectively to said first pair of the second electrovalve, said third pair of orifices of said first electrovalve being connected respectively to the outputs of said servovalve, said second pair of orifices of said second electrovalve being connected together by a contraction or the like, and said third pair of orifices of said second electrovalve being connected together by a free communication.

12. Flight control system as claimed in claim 8, wherein each hydraulic servocontrol for an elevator comprises a servovalve comprising a mechanical input, a jack with two cylinder chambers separated by a piston with symmetrical faces connected to said elevator, a sensor for detecting a position of said piston and controlling a position of re-alignment of said elevator with respect to said horizontal stabilizer with variable angle of incidence, a mechanical connection between said sensor and said servovalve and an electrovalve comprising two first orifices respectively connected to said cylinder chambers, two second orifices respectively connected to the outputs of the servovalve and two third orifices connected together by a contraction or the like, said first and second orifices being respectively connected together when the electrovalve is not energized whereas said first and third orifices are respectively connected together when said electrovalve is energized.

13. Flight control system as claimed in any one of claims 10 to 12, wherein each servocontrol is equipped with a system of flaps isolating said servocontrol from its external hydraulic connections when the pressure of the fluid inside said connections reduces or disappears and with a reservoir of pressurized fluid to keep up the hydraulic filling of said servocontrol, when the latter is isolated by said flap system.

14. Flight control system as claimed in claim 2, wherein said second computer unit comprises a plurality of separate computers, each one controlling and monitoring part of said upper surface spoilers and air brakes.

15. Flight control system as claimed in claim 14, wherein each computer fulfills normal control functions and emergency control functions.

* * * * *